United States Patent
Yamada et al.

(10) Patent No.: US 7,941,567 B2
(45) Date of Patent: May 10, 2011

(54) MODULAR COMPUTER SYSTEM AND I/O MODULE

(75) Inventors: Tsutomu Yamada, Hitachi (JP);
Tetsuaki Nakamikawa, Hitachi (JP);
Hiromichi Endoh, Hitachi (JP);
Noritaka Matsumoto, Hitachi (JP);
Hirokazu Kasashima, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 954 days.

(21) Appl. No.: 11/782,286

(22) Filed: Jul. 24, 2007

(65) Prior Publication Data

US 2007/0266184 A1  Nov. 15, 2007

Related U.S. Application Data

(63) Continuation of application No. 10/759,193, filed on Jan. 20, 2004, now Pat. No. 7,272,665.

(30) Foreign Application Priority Data

Apr. 23, 2003  (JP) ................................ 2003-118714

(51) Int. Cl.
*G06F 3/00* (2006.01)
*G06F 13/42* (2006.01)
*H02J 13/00* (2006.01)
(52) U.S. Cl. ............ 710/3; 340/825; 340/825.52; 710/1
(58) Field of Classification Search .................. 340/825, 340/825.52; 710/1, 3, 100, 300–302, 104, 710/105, 305
See application file for complete search history.

(56) References Cited

U.S. PATENT DOCUMENTS

| | | | |
|---|---|---|---|
| 4,727,475 A | 2/1988 | Kiremidjian |
| 5,462,442 A | 10/1995 | Umemura et al. |
| 5,790,782 A | 8/1998 | Martinez et al. |
| 5,999,989 A | 12/1999 | Patel |
| 6,003,097 A | 12/1999 | Richman et al. |
| 6,542,373 B1 | 4/2003 | Oba |
| 2002/0065950 A1 | 5/2002 | Katz et al. |
| 2003/0041088 A1 | 2/2003 | Wilson et al. |

OTHER PUBLICATIONS

PC/104-Plus Specification, Version 1.2, Aug. 2001.

*Primary Examiner* — Chun-Kuan Lee
*Assistant Examiner* — Richard B Franklin
(74) *Attorney, Agent, or Firm* — Antonelli, Terry, Stout & Kraus, LLP.

(57) ABSTRACT

A modular computer system formed by connecting a processing module having a processor mounted thereon and a plurality of I/O modules in a stacked form via connectors, where differing ones of the plurality of I/O modules being differing types of I/O modules from one another, which operate with mutually differing types of bus-layout configurations. In accordance with the association of I/O modules with identification information, for each differing type of I/O module stacked via the connectors, said processing module selects from differing preset bus-layout configurations and device drivers from a memory, to dynamically reconfigure the reconfigurable generic bus for accessing the differing type of I/O module.

8 Claims, 14 Drawing Sheets

MODULAR COMPUTER SYSTEM AND I/O MODULE

CROSS REFERENCE TO RELATED APPLICATION

This is a continuation of U.S. application Ser. No. 10/759,193, filed Jan. 20, 2004 now U.S. Pat. No. 7,272,665. This application relates to and claims priority from Japanese Patent Application No. 2003-118714, filed on Apr. 23, 2003. The entirety of the contents and subject matter of all of the above is incorporated herein by reference.

BACKGROUND OF THE INVENTION

The present invention relates to a modular computer system constructed by combining a plurality of function modules, and in particular to a modular computer system suitable for controllers incorporated in industrial machines and robots.

As the scheme for constructing a computer system by combining a plurality of function modules, various schemes have been proposed (for example, PC/104-plus Specification Version 1.2: PC/104 Embedded Consortium (established in August 2001)). According to this paper, for example, a board of a processing module having a processor mounted thereon and boards of I/O modules, on each of which an interface device functioning between the processing module and a peripheral device is mounted, are stacked via connectors forming a bus. In such a modular computer system, it is necessary, in order to manage system devices such as the I/O modules, for the processor mounted on the processing module to, for example, discriminate a kind of an I/O device mounted on an I/O module and specify a device driver to be used by an operating system (OS) in order to drive an I/O device. In other words, the operating system (OS) searches a table having device drivers respectively associated with identification codes of I/O devices, specifies a device driver of the discriminated I/O driver, develops it on a memory, and thereby initializes the I/O device or conducts access processing on the I/O device on demand.

In the above-described paper, the processor selects an I/O module by using an IDSEL signal in order to discriminate a connected I/O device, reads values of configuration registers provided in PCI devices included in the I/O module, and recognizes a PCI device. In this case, in order to connect a PCI device on the processor side and a PCI device on the I/O side to each other via a PCI bus and directly specify a subject PCI device by using an IDSEL signal, connectors based on the PCI bus specifications are disposed on the module boards and individual wiring for the IDSEL signal is conducted between the PCI device on the processor side and the PCI device on the I/O side. The modules of such a PCI scheme have a plug and play function, which is a function of suitably initializing I/O devices, a sophisticated function, and an advantage that flexible configuration can be implemented. As a conventional scheme having the plug and pay function in such a module configuration, for example, a device recognition technique of ISA bus scheme is known.

In the conventional modular technique described in the above-described paper, however, attention is not paid to incorporate arbitrary I/O modules as in a computer system used in a controller incorporated in industrial machines and robots (hereafter referred to as embedded controller). In other words, in the conventional modular technique, design time and labor do not pose a great problem, in the case where incorporated I/O devices are specified as in embedded computer systems specified in concrete use. In the case where arbitrary I/O modules are incorporated, however, there is a problem that it takes time for design and labor is required for fabrication.

In other words, in the case of a computer system used in embedded controllers incorporated in industrial machines and robots, typically it is urgently demanded that the computer system be formed of only minimum required parts in order to minimize the cost at the time of mass production. In addition, because of the demand for reduction in size of industrial machines having controllers incorporated therein, the amounting volume must be made small to the utmost. Therefore, it is desired that the module in which the controller is incorporated can be made small in size as far as possible. In the case where the computer system is used in the embedded controller, it is desirable that each module should have a single function as far as possible and a computer system having a desired function should be constructed by combining a plurality of I/O modules or the like having various functions as occasion demands.

In the case of the conventional PCI scheme, however, the number of connector pins increases according to the number of signal lines in the PCI bus, and an intelligent element for exercising the PCI bus control must be provided in each I/O module. This results in a problem that the mounting area of the board increases and the size reduction is limited. Furthermore, the bus connecting the modules is premised on a specified single bus scheme such as the PCI bus. If a plurality of devices having different bus schemes are used on the same bus, therefore, it is impossible to recognize a device and implement the plug and play function.

For supposing that arbitrary I/O modules are incorporated as in the embedded controller and providing the computer system with the plug and play function, therefore, a technique for discriminating a device in an embedded I/O module without being restrained to a specific bus scheme is desired.

Furthermore, according to the conventional modular technique, it is necessary to conduct individual wiring for the IDSEL signal between the PCI device on the processor side and PCI devices on the I/O side. Therefore, a plurality of IDSEL signal lines are provided on the bus, and IDSEL signal lines connected to modules are individually set every module. In general, this configuration must be implemented by manual work every module. Therefore, the operation man-hour and test man-hour increase. Furthermore, there is a problem that the mounting area and price are increased by switches, and it is difficult to completely eliminate false configuration.

SUMMARY OF THE INVENTION

An object of the present invention is to discriminate kinds of I/O modules incorporated in the computer system without being restrained to a specific bus scheme.

In order to achieve the object, in accordance with the present invention, module exclusive selection parts are respectively provided in I/O modules connected in a stacked form to a processing module via connectors. The module exclusive selection parts judge only a module select signal input from terminals in the same position on processing module side connectors to be active. And module select signals successively output from the processing module are input to terminals in the same position on processing module side connectors according to the connection order of the I/O modules. Without being restrained to a specific bus scheme, therefore, one I/O module can be selected by a simple module select signal and a simple connection configuration or circuit configuration. Furthermore, an ID output for outputting identification information of its own I/O module to a predetermined terminal on the connector on the basis of a module select activate signal output when the module exclusive selection part has judged active is provided. Without being restrained to a specific bus scheme, therefore, the processing module can acquire identification information of the I/O modules by using an ID input part connected to a terminal associated with the predetermined terminal on the connector. For example, identification information of an I/O module associated with a module select signal output according to the connection order can be acquired.

As a result, the processing module can read out preset bus control parameter and device drivers of I/O modules in accordance with acquired association relations of I/O modules with identification information, and access the I/O modules. Furthermore, according to the present invention, the module exclusive selection parts relating to discrimination of respective I/O modules can be made to have the same structure. Therefore, setting using manual work every module becomes unnecessary. Even in the case where modules having the same circuit are combined, devices can be discriminated.

Other objects, features and advantages of the invention will become apparent from the following description of the embodiments of the invention taken in conjunction with the accompanying drawings.

DESCRIPTION OF THE EMBODIMENTS

Hereafter, embodiments of the present invention will be described with reference to the drawings.

First Embodiment

Figure 1:
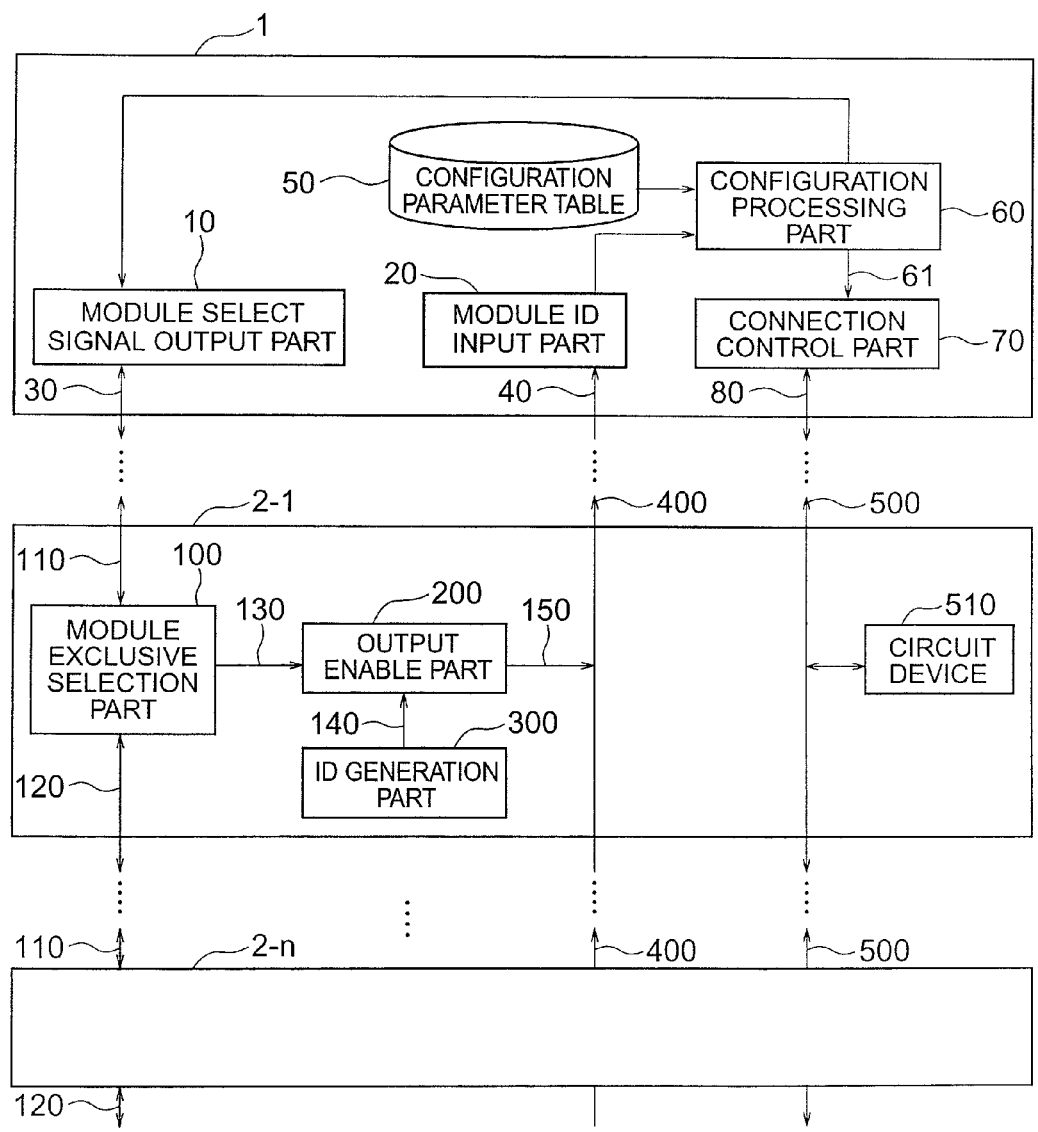
FIG. 1 is a general configuration diagram of a first embodiment of a computer system according to the present invention.

FIG. 1 shows a general configuration of a first embodiment of a modular computer system according to the present invention. The computer system of the present embodiment includes a processing module 1 and a plurality of I/O modules 2 (n I/O modules 2-1 to 2-*n* in FIG. 1). The processing module 1 is provided to manage the configuration of the computer system. The processing module 1 includes a module select signal output part 10, a module ID input part 20, a configuration parameter table 50, a configuration processing part 60 and a connection control part 70.

The module select signal output part 10 outputs a module select signal 30 to a signal line 110 of a connector in order to select arbitrary one of the I/O modules 2-1 to 2-*n*. A module ID input part 20 takes in a module ID signal 40 output from an I/O module 2 to a module ID bus 400. By the way, the module select signal output part 10 includes a plurality of output buffers for driving the module select signal 30. The module ID input part 20 includes a plurality of input buffers in order to take in the state of the module ID signal 40. Specifically, each of the module select signal output part 10 and the module ID input part 20 includes a processor, a memory, and a plurality of I/O port pins. The module select signal output part 10 and the module ID input part 20 are controlled respectively by individual processors and memories or controlled by the same processor and memory. The processor drives or reads the I/O port pins in accordance with a command sequence stored in the memory.

In general, the I/O module 2 accepts an I/O request from the processing module 1, and executes arithmetic operations, holding and inputting from/ outputting to the outside of the computer. The I/O module 2 includes a module exclusive selection part 100, an ID information output part including an output enable part 200 and an ID generation part 300, and a circuit device 510 serving as an I/O device.

The module exclusive selection part 100 receives a module select signal 30 from an adjacent module, determines whether the module select signal 30 is destined to its own module, and reflects its result to a module select activate signal 130. For example, in the case where its own I/O module has been selected, the module exclusive selection part 100 sets a potential of the module select activate signal 130 equal to a high potential (high level) representing the active state. Herein, driving the potential of a signal line to the active state is referred to as "assert" and driving the potential of the signal line to the inactive state is referred to as "negate." The module exclusive selection part 100 in the I/O module 2-1 outputs the module select signal 30 to the adjacent I/O module 2-2 via a signal line 120 of the module select signal. According to a feature of the present invention, a module select signal 30 that is input to a signal line 110 of one I/O module is made different in state from a module select signal 30 that is input to another I/O module via a signal line 120 of the one I/O module. This point will be described later.

The ID generation part 300 generates an ID serving as an identification code for identifying an I/O module 2, and outputs an ID data signal 140. The output enable part 200 receives the module select activate signal 130. If the module select activate signal 130 is in the active state, the output enable part 200 outputs the ID data signal 140 to the module ID bus 400. On the other hand, if the module select activate signal 130 is in the inactive state, the output enable part 200 does not output the ID data signal 140 to the module ID bus 400. As a result, only the ID data signal 140 of the one and only selected I/O module 2 is output on the module ID bus 400.

Owing to such a configuration, the processing module 1 outputs the module select signal 30 for selecting an arbitrary I/O module out of the I/O modules 2-1 to 2-n, and causes the I/O module selected by the module select signal 30 to output the ID data signal 140 to the module ID bus 400. As a result, it becomes possible to acquire ID information of all I/O modules 2 belonging to the computer system, in association. Furthermore, the signal line 110 supplied with the module select signal 30, the signal line 120 for outputting the module select signal 30, and the module ID bus 400 are connected between an I/O module 2 and adjacent I/O modules 2 via connectors. As a result, signal lines can be prevented from increasing.

A concrete embodiment of the module exclusive selection part 100 shown in FIG. 1 will now be described with reference to FIG. 2. According to a feature of the present invention, the module exclusive selection parts 100 are formed of the same circuit. In other words, the module exclusive selection parts 100 are formed so as to be supplied with the module select signal 30 from the signal line 110 connected to a terminal in the same position of the connector on the processing module side. It is a feature of the module exclusive selection part 100 that the processing module 1 can select an I/O module 2 connected to an arbitrary position although the I/O modules 2 are coupled to each other in a layer form via connectors.

Figure 2:
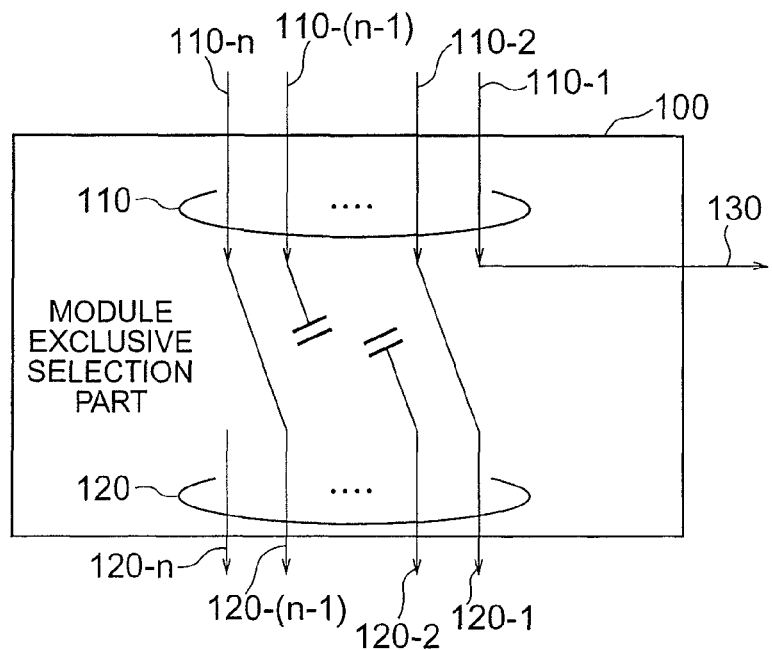
FIG. 2 is a detailed configuration diagram of a module exclusive selection part in a first embodiment.

In the embodiment shown in FIG. 2, the module exclusive selection part 100 is implemented by a wiring method. The module select signal 30 is input from an adjacent I/O module 2 on the processing module side, via the signal line 110. A signal line 110-1 among the signal lines 110 is used as the module select activate signal 130. Remaining signal lines 110-x (where x=2 to n) are shifted by one signal line and connected to signal lines 120-(x-1) of an adjacent I/O module 2 disposed on the side opposite to the processing module. A signal line 120-n may be opened or may be connected to the signal line 110-1. In other words, the module exclusive selection parts 100 in the I/O modules 2 are formed so as to bring the module select activate signal 130 to the active state when the module select signal 30 is input from a terminal (the signal line 110-1) in the same position on the connector of the processing module side. In the case of the module exclusive selection part 100 of the present embodiment, therefore, the processing module 1 can select the I/O modules 2-1 to n successively by outputting the module select signals 30-1 to n successively in association with the signal lines 110-1 to n. For example, in order to select the I/O module 2-1, which is the nearest to the processing module, the module select signal output part 10 drives the module select signal 30-1 to the high level, and sets other module select signals 30-2 to n to the low level. As a result, the module select activate signal 130 in the I/O module 2-1 is asserted by the module exclusive selection part 100, and the module select activate signals 130 in the I/O modules 2-2 to n are negated by the module exclusive selection part 100. In the same way, for selecting a module that is the xth furthest away from the processing module 1, the module select signal output part 10 drives only the module select signal 30-x to the high level.

Figure 3:
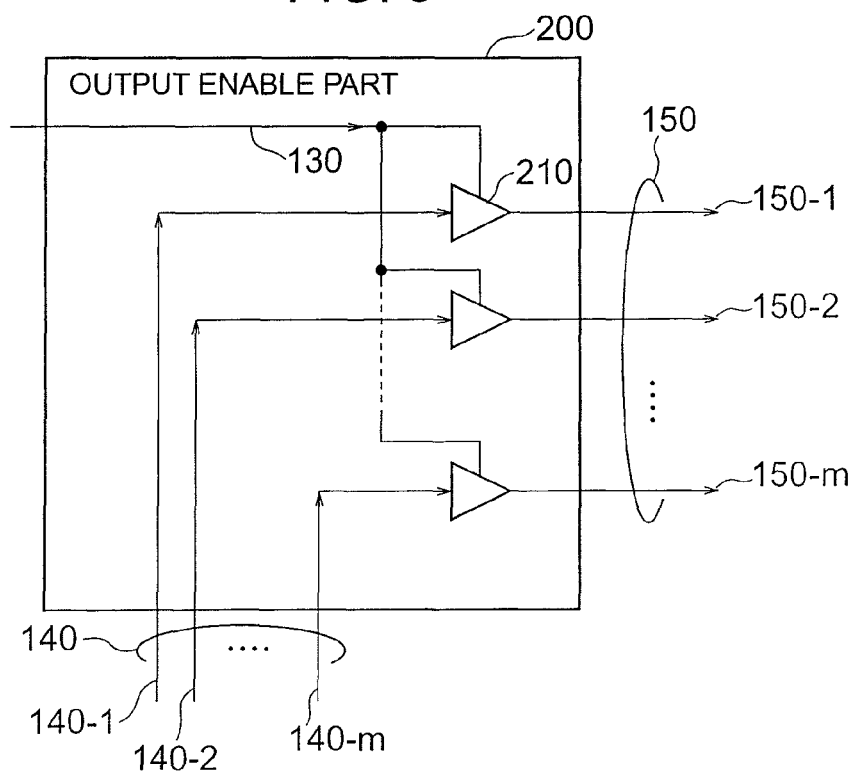
FIG. 3 is a detailed configuration diagram of an output enable part in a first embodiment.
Figure 4:
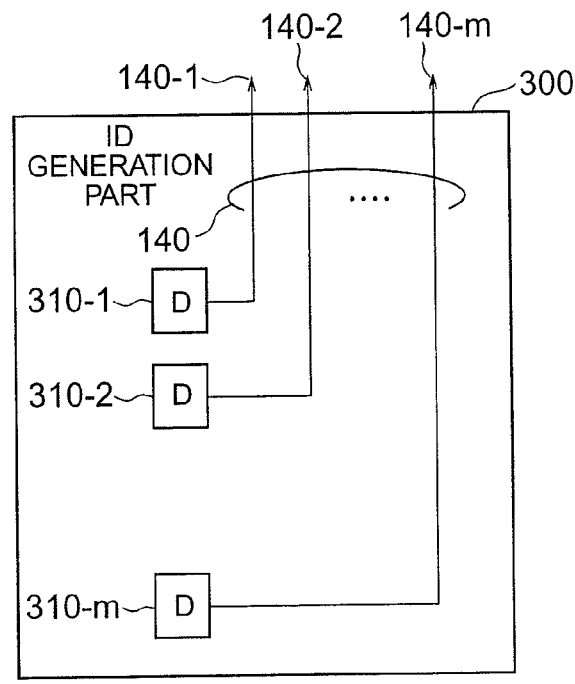
FIG. 4 is a detailed configuration diagram of an ID generation part in a first embodiment.

An embodiment of the ID information output part for outputting the ID data signal 140 from the I/O module 2 to the module ID bus 400 according to the module select activate signal 130 asserted by the module exclusive selection part 100 will now be described with reference to FIGS. 3 and 4. FIG. 3 shows a configuration example of the output enable part 200. FIG. 4 shows a configuration example of the ID generation part 300. As shown in FIG. 4, the ID generation part 300 is provided to generate ID data of identification information for identifying the kind and function of the I/O module 2. The ID generation part 300 includes ID generators 310-1 to 310-m. ID data signals 140-1 to 140-m are output from the ID generators 310-1 to 310-m, respectively. The ID generator 310 is a circuit in which an output level can be individually set. Output levels may be two values composed of the high level and the low level, or arbitrary voltage levels (multi-values). The multi-value voltage level is effective in increasing the information content of the ID information. Contents of the ID data signal 140 can be changed by individually setting output levels in the ID generators 310.

As the ID generator 310 for outputting two values, a pull-up/pull-down resistor, a switch, a jumper-pin, a flip-flop, a volatile memory such as an SRAM or DRAM, or an non-volatile memory such as an EEPROM or a flash memory can be used. As the ID generator 310 for outputting a multi-value, a resistor divider circuit and an op-amp are used.

The output enable part 200 includes a plurality of gate elements 210 supplied with ID data signals 140-1 to m, which are output from respective ID generators in the ID generation part 300. Each of the gate elements 210 is an element that is opened in gate only when the module select activate signal 130 is in the active state. When the module select activate signal 130 is in the active state, therefore, the ID data signal 140 is output from the output enable part 200 to the module ID bus 400 as the ID output signal 150. If the module select activate signal 130 is negated, the gate element 210 is brought into the high impedance state and an ID output signal 150 is not output. As the gate element 210, an ordinary three-state buffer or a MOS (Metal Oxide Semiconductor) transfer gate can be used. In the case where a transfer gate is used, it becomes possible to transfer an arbitrary voltage level (a range depending upon the element) from the input to the output.

Figure 5:
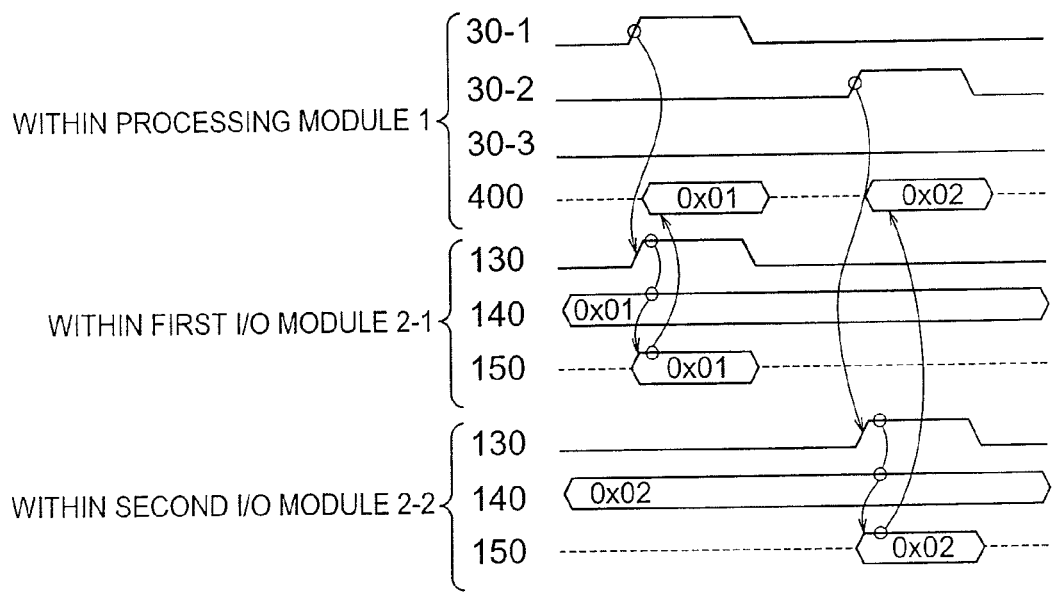
FIG. 5 is a timing chart showing operation of a first embodiment.

A timing chart at the time when acquiring the ID data signals 140 in I/O modules by using the processing module is shown in FIG. 5. In FIG. 5, signal states of the processing module 1 and two I/O modules 2-1 and 2-2 are illustrated. The ordinate indicates signal kinds, and the abscissa indicates time. First, the module select signal output part 10 sets the module select signal 30-1 for driving the signal line 110-1, to the high level. As a result, the module select activate signal 130 in the first connected I/O module 2-1 is asserted. Accordingly, the gate elements 210 in the output enable part 200 are enabled. "0x01" (where 0x is a prefix representing a hexadecimal number) is output from the ID generation part 300, and this is output to the module ID bus 400 as the ID output signal 150. At this time, an ID output signal 150 is not output to the module ID bus 400 from other I/O modules 2. The module ID input part 20 in the processing module 1 acquires the ID output signal 150 of the first I/O module 2-1 via the module ID bus 400. As a result, the processing module 1 recognizes that the I/O module having "0x01" as its ID is connected to the first I/O module 2-1. Subsequently, the module select signal output part 10 drives the module select signal 30-2 in order to acquire an ID of the second I/O module 2-2. In the same way, "0x02," which is an ID of the second I/O module 2-2, is acquired by the module ID input part 20, and a kind of the I/O module 2-2 is recognized.

By repeating the operation heretofore described while altering the drive signal for the module select signal 30, the processing module 1 can acquire ID information of all I/O modules 2 to be managed by itself. According to the present embodiment, the module select signal output part 10 in the processing module 1 thus can drive the module select activate signal 130 in an I/O module 2 that is located in arbitrary position, even in the case where a plurality of I/O modules 2 are coupled. Furthermore, even in the case where a plurality of I/O modules 2 having the same circuit configuration are coupled, it is possible to drive only the module select activate signal 130 in an I/O module 2 that is located in arbitrary position and acquire identification information of the selected I/O module 2.

When the computer system has been constructed, therefore, an order is issued from the configuration processing part 60 in the processing module 1 to the module select signal output part 10 so as to output ID information of the connected I/O module 2 to the module ID bus 400. As a result, the ID of the I/O module 2 having the circuit device 510 is input to the module ID input part 20 via the module ID bus 400. Upon acquiring the ID from the module ID bus, the module ID input part 20 notifies the configuration processing part 60 of the ID information. The configuration processing part 60 searches the configuration parameter table 50 by using the ID information as a key, and acquires parameters for a system bus 500 to which the circuit device 510 is connected. The configuration processing part 60 sets the acquired parameters in the connection control part 70, and conducts initialization in order to access the circuit device 510. By the way, the connection control part 70 has a sequencer for controlling a system bus signal 80 and the system bus 500. On the basis of the acquired ID, the configuration processing part 60 prepares a device driver associated with the circuit device 510 to be accessed. The device driver conducts necessary initialization on the circuit device 510. In this way, the processing module 1 can alter the parameters for the system bus 500 according to the circuit device 510, and access the circuit device 510. Furthermore, the processing module 1 can initialize the circuit device 510.

Figure 6:
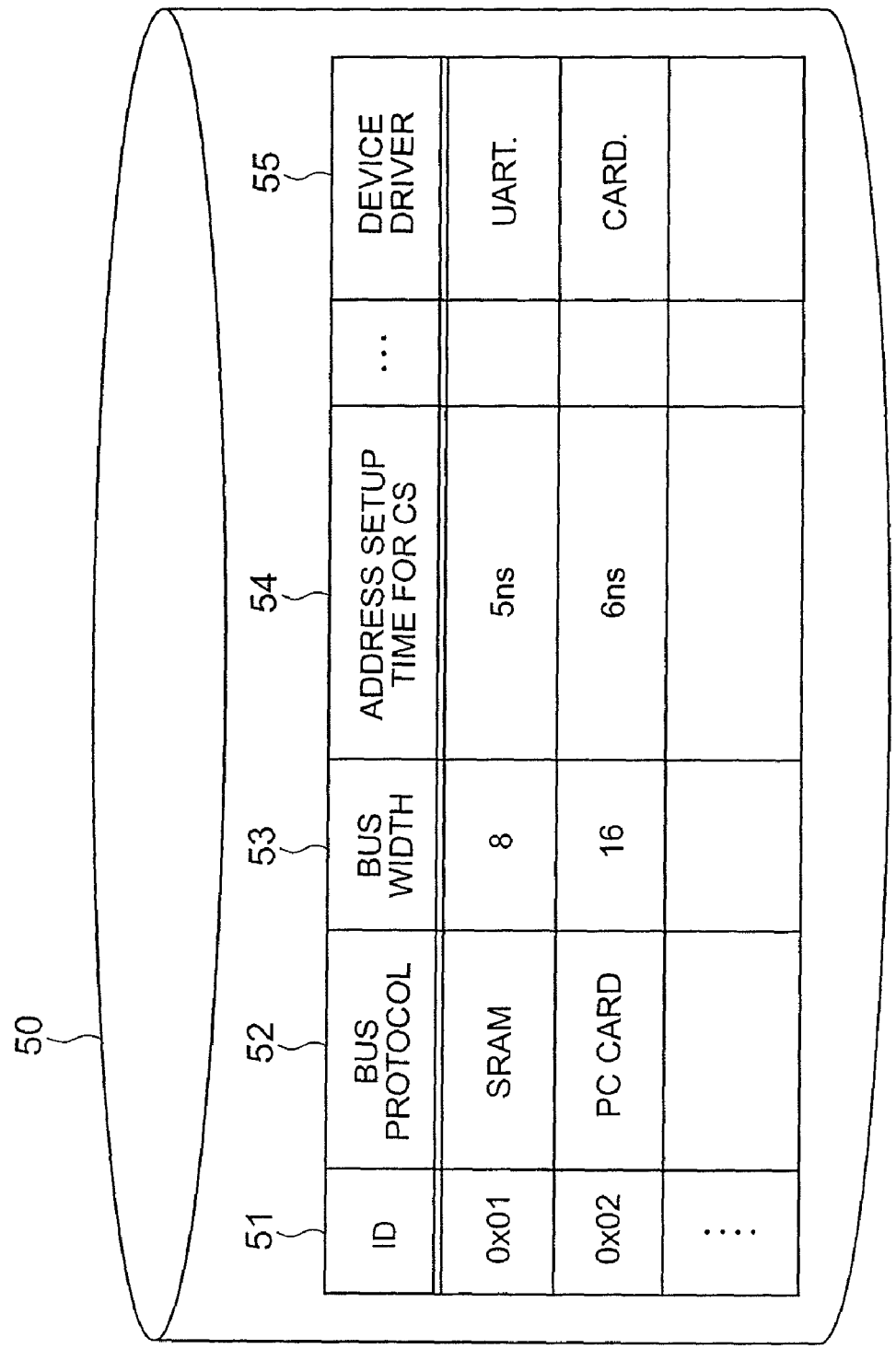
FIG. 6 is a diagram showing a configuration of a configuration parameter table in a first embodiment.

A configuration of the configuration parameter table 50 is shown in FIG. 6. As shown in FIG. 6, the configuration parameter table 50 includes IDs, bus parameters and software names. The bus parameters include, for example, bus protocols, timing such as setup/hold time for address data and the control signal, and bus widths. In the example shown in FIG. 6, an ID 51, a bus protocol 52, a bus bit width 53, an address signal setup time for chip select (CS) 54 and a device driver 55 are indicated as elements in the column direction. Elements in the row direction indicate parameter sets respectively associated with ID values. For example, the I/O module 2 having "0x02" as its ID value is shown to have a bus protocol for accessing based upon the PC card bus, a bus bit width of 16 bits, address setup time of 6 ns, and an associated device driver being Card.0. Although elements in the row and column directions are partially omitted in FIG. 6, all parameters required for bus access are tabulated in the actual configuration parameter table 50. Preferably, the configuration parameter table 50 is constructed on the memory. For example, for implementing by using the C language, the search is facilitated by defining a structure variable having parameters as members, preparing an array of this structure variable, and using the ID as an index of the array. It is not realistic to support a large number of IDs, i.e., a large number of I/O modules 2 when actually constructing a computer system, because the amount of the held device drivers and complication of the control increase. As a matter of fact, therefore, associated IDs are limited. In a method using the array, it is necessary to implement so that IDs that are not associated may be discriminated. For example, it is necessary to mark specific members of the structure variable. In this way, it becomes possible to search for an associated bus parameter or a device driver by using an ID as a key.

Figure 7:
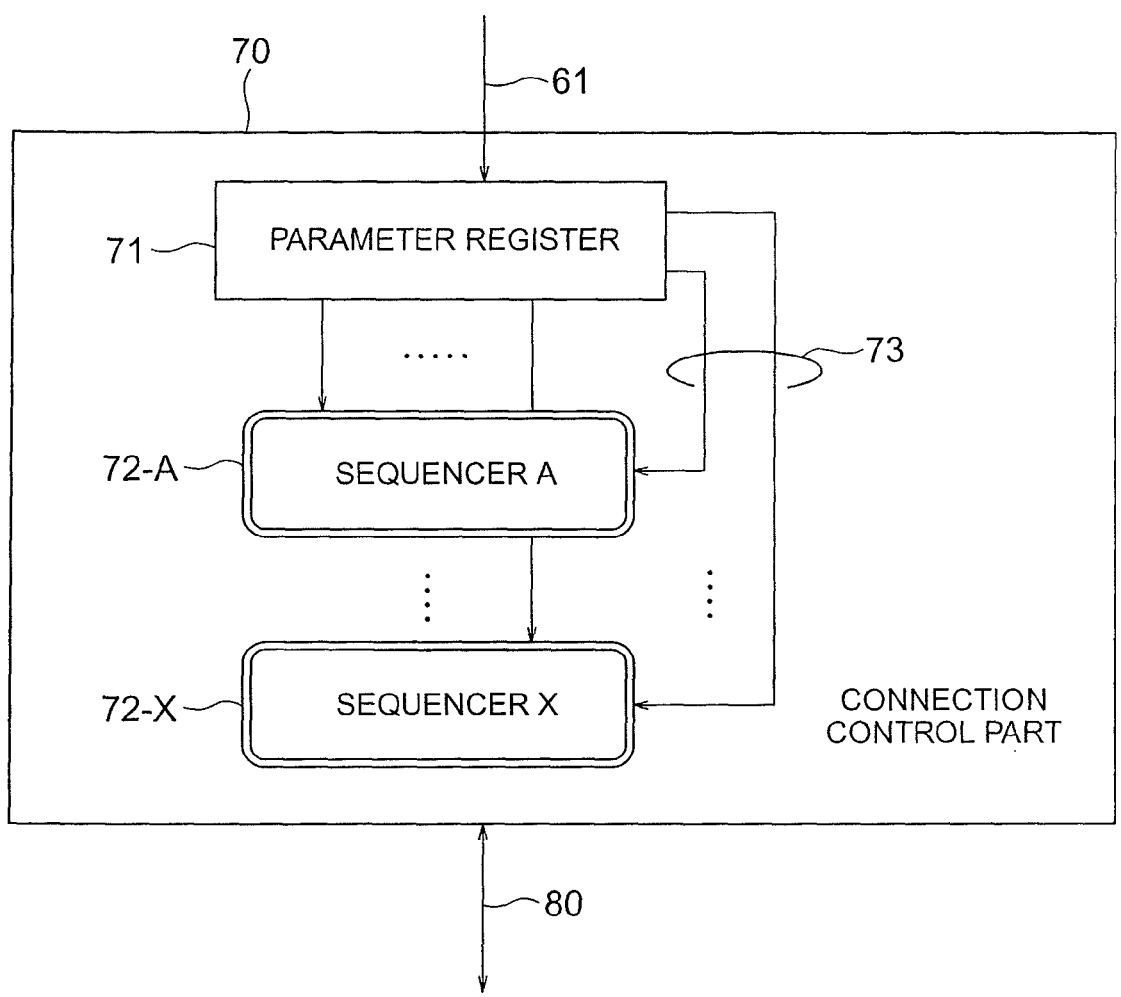
FIG. 7 is a diagram showing a configuration of a connection control part in a first embodiment.

A configuration of an embodiment of the connection control part 70 is shown in FIG. 7. When the processing module 1 accesses the system bus signal 80, the connection control part 70 prescribes a procedure and timing for controlling the system bus signal 80. Specifically, the connection control part 70 controls a protocol for bus access (such as the SRAM interface, the DRAM interface or the PC card interface) and setup/hold time between bus control signals. The configuration processing part 60 sets parameters concerning the bus access in a parameter register 71 via a parameter configuration signal 61. The parameter register 71 conducts selection on bus sequencers 72-A to 72-X (collectively referred to as 72) by using a sequencer select signal 73 as occasion demands. For example, the bus protocol for the SRAM access is very different from the bus protocol for the DRAM access in how to handle the address, data signal and control signal. In such a case, it is more convenient to select a bus sequencer every bus protocol. The bus sequencer 72 adjusts timing of the bus access operation according to an order given by the parameter register 71. For example, the bus sequencer 72 puts address output timing forward or backward according to "address setup time stipulations for chip select signal" requested by the circuit device 510.

Figure 8:
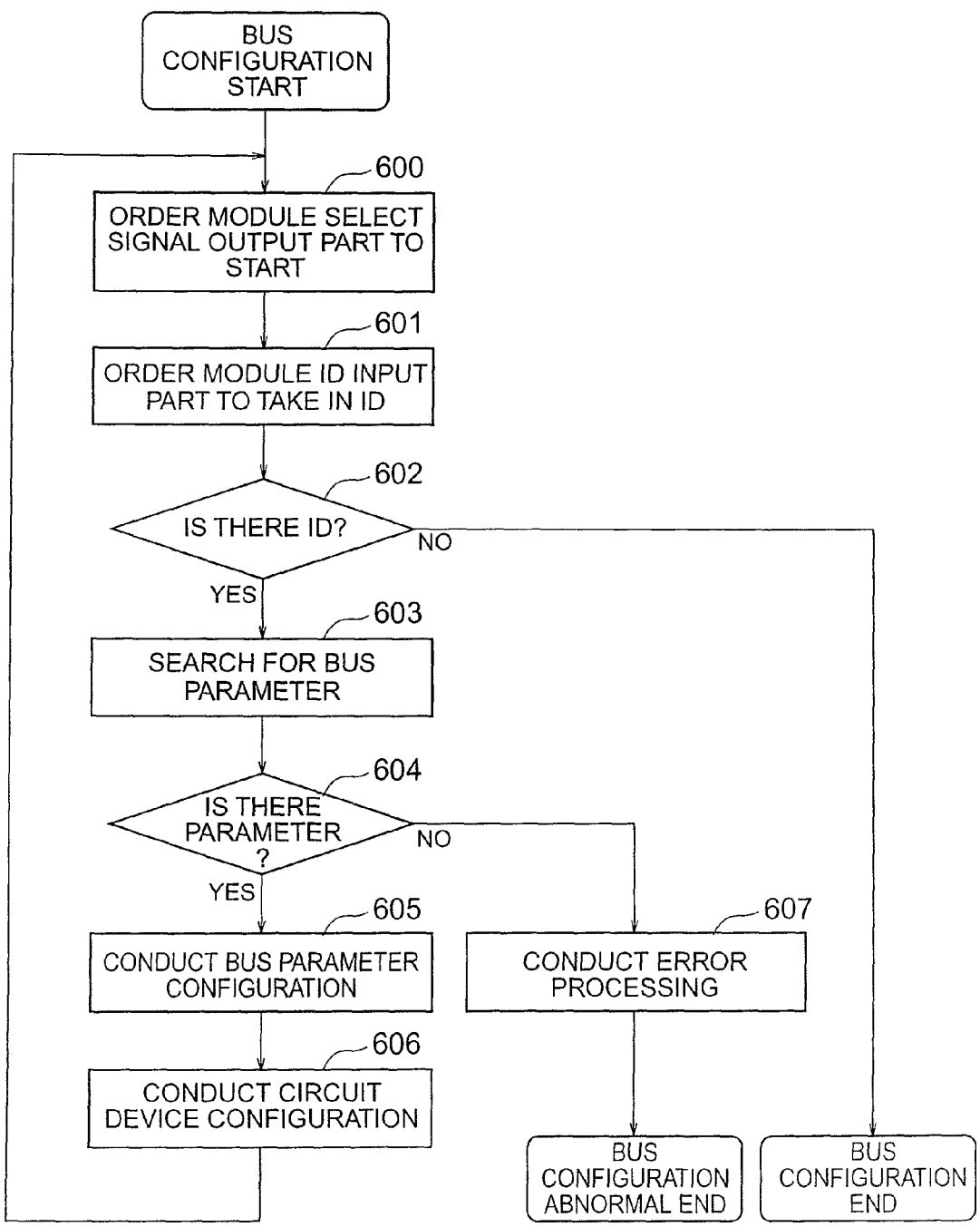
FIG. 8 is a flow chart showing a procedure of bus initialization in a first embodiment.

A flow chart showing operation of the configuration processing part 60 is shown in FIG. 8. The configuration processing part 60 specifies an I/O module 2 managed by the processing module 1, sets necessary bus parameters, and initializes the circuit device 510. It is suitable that these kinds of processing are executed by a processor and a memory. At that time, the processor executes these kinds of processing according to a command sequence stored in the memory.

Bus configuration processing shown in FIG. 8 will now be described. The configuration processing part 60 orders the module select signal output part 10 to make the module select activate signal 130 in the I/O module 2 active (process 600). Subsequently, the configuration processing part 60 orders the module ID input part 20 to acquire an ID on the module ID bus 400 (process 601). The configuration processing part 60 obtains the ID acquired as a result, from the module ID input part 20. The configuration processing part 60 determines whether the obtained ID is an active ID (process 602). If an I/O module selected by the module select signal output part 10 does not exist really, there is brought about a state in which any I/O module does not drive the module ID bus 400, i.e., a state an inactive ID exists on the module ID bus 400. Therefore, the configuration processing part 60 needs to determine whether the obtained ID is active. If the obtained ID is an inactive ID (i.e., if the decision in the process 602 is "No"), then all I/O modules are considered to have been inspected, and "bus configuration end" is reached, the processing being finished. If the obtained ID is an active ID, the configuration processing part 60 searches the configuration parameter table 50 for an associated parameter by using the ID as a key (process 603). This process aims at obtaining bus parameters and information of a device driver associated with the circuit device 510. As a result, it is inspected whether active data associated with the ID exists (process 604). If the associated parameters and device driver do not exist, error processing is conducted because the procedure to be initialized is indistinct even if the I/O module exists (process 607). After error processing, "bus configuration abnormal end" is reached and the processing is finished. It is effective in management to communicate the contents of the error processing to the outside of the computer by using sound, light or the console output. At this time, the configuration processing part 60 can grasp the physical position of the I/O module 2 in which a problem has occurred. If a problem has occurred in, for example, the nth I/O module 2, it is suitable to give a notice by conducting intermission of sound or light n times. If bus parameters are obtained, the configuration processing part 60 conducts bus initialization for the connection control part 70 (process 605). The connection control part 70 sets the bus protocol, bus width, bus access timing and the like. Subsequently, the connection control part 70 initializes the circuit device 510 by using a device driver as occasion demands (process 606). In some operating systems (OSs) operated in computers, the sequence of calling device drivers is prescribed, and configuration at this time is difficult. In that case, the configuration processing part 60 only registers the configuration of the I/O module 2 in the OS so that the OS may call a suitable device driver later. If the process 606 is finished, the processing returns to the process 600 and the above-described processing is continued. By conducting the processing heretofore described until the "bus configuration end" is reached, configuration of buses concerning all I/O modules can be included. As for the process 605 and the process 606, it is conceivable that the processing conducted in, for example, the process 605 is implemented so as to be included in the initialization routine of the device driver. In this case, the step of the process 605 becomes unnecessary. Only IDs and device drivers need to be described in the configuration parameter table 50. As for whether the bus parameter configuration in the process 605 is included in device driver processing, suitable means suited to the OS to be used may be selected.

Second Embodiment

Figure 9:
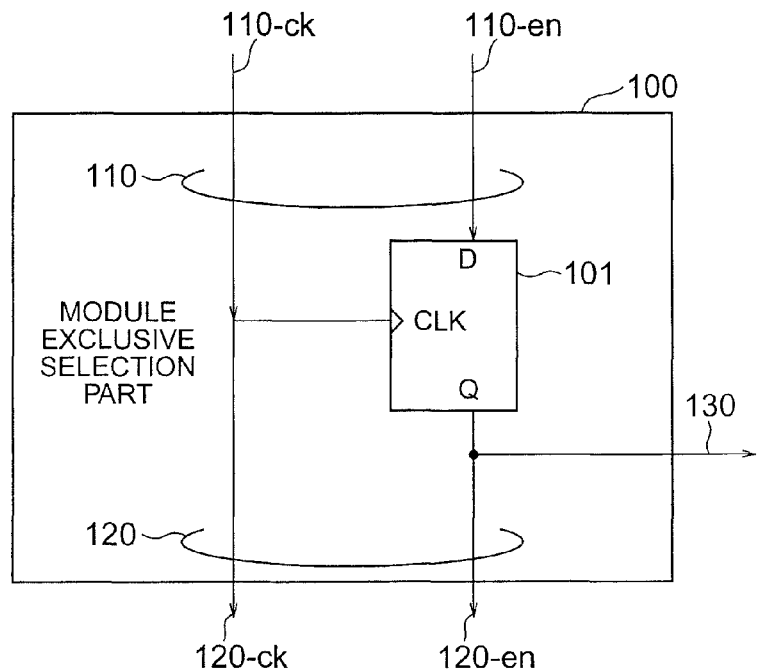
FIG. 9 is a detailed configuration diagram of a module exclusive selection part in a second embodiment of a computer system according to the present invention.

Another embodiment of the module exclusive selection part 100 is shown in FIG. 9. The module exclusive selection part 100 of the present embodiment is formed of a D flip-flop 101. In the case of the embodiment shown in FIG. 2, the signal lines 110 and 120 must be prepared according to the maximum number of I/O modules 2 connected to the computer system. For example, if the number of the signal lines 110 and 120 is n, the maximum number of I/O modules 2 that can be connected becomes n, resulting in a problem of increased mounting area and cost.

According to the embodiment shown in FIG. 9, it is possible not to limit the maximum number of the I/O modules 2 that can be connected, and to make the number of input and output signal lines constant. In other words, the module select signal in the present embodiment includes a module select clock signal line 110-ck and a module select enable signal line 110-en. The module select clock signal line 110-ck is connected to a clock input terminal CLK of a D flip-flop 101 and a signal line 110-ck of a module select clock output signal and a signal line 120-ck of the module select clock output signal. The module select enable signal line 110-en is connected to a data input terminal D of the D flip-flop 101. A data output terminal Q of the D flip-flop 101 is connected to a signal line 120-en of a module select enable output signal and a module select activate signal 130. The signal line 120-ck of the module select clock output signal and the signal line 120-en of the module select enable output signal are connected to the module select clock signal line 110-ck and the module select enable signal line 110-en of an adjacent I/O module 2, respectively. When the signal input to the clock input terminal CLK makes a transition (rises) from the low level to the high level, the D flip-flop 101 takes in a value at the data input terminal D and outputs it to the data output terminal Q. The value at the data output terminal Q is held so long as there is no rising edge in the signal level at the clock input terminal CLK.

Figure 10:
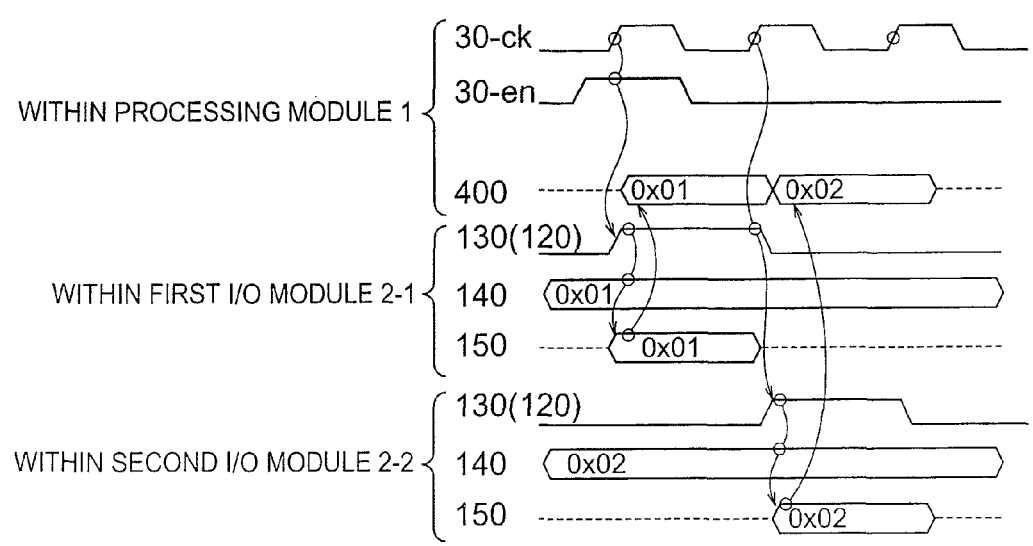
FIG. 10 is a timing chart showing operation of a second embodiment.

A timing chart concerning the module selection operation in the present embodiment is shown in FIG. 10. In the same way as FIG. 5, signal states of the processing module 1 and two I/O modules 2 are illustrated. The ordinate indicates signal kinds, and the abscissa indicates time. The module select signal output part 10 in the processing module 1 sets the module select enable signal 30-en to the high level, and then changes the module select clock signal 30-ck from the low level to the high level. In the first I/O module 2-1, therefore, a level on the module select enable signal line 110-en is taken in, and the signal line 120-en of the module select enable output signal and the module select activate signal 130 are asserted. "0x01," which is the ID associated with the kind of the first I/O module 2-1, is output as the ID data signal 140 in the first I/O module 2-1. Eventually, "0x01" is output as the ID output signal 150 of the first I/O module 2-1. At this time, only the first I/O module 2-1 outputs a value to the module ID bus 400. The module ID input part 20 in the processing module 1 acquires a value of the module ID bus 400 from the module ID signal 40.

In this way, the processing module 1 recognizes that the I/O module having "0x01" as its ID is connected to the first I/O module 2-1. Subsequently, the module select signal output part 10 drives the module select enable signal 30-en to the low level. In addition, the module select signal output part 10 restores the module select clock signal 30-ck to the low level, and thereafter drives the module select clock signal 30-ck to the high level again. As a result, the level of the signal line 120-en of the module select enable output signal output from the first I/O module 2-1 is taken in the D flip-flop 101 in the module exclusive selection part 100 in the second I/O module 2-2. As a result, the module select activate signal 130 in the first I/O module is negated, and the module select activate signal 130 in the second I/O module is asserted.

"0x02," which is an ID associated with a kind of the second I/O module 2-2, is output as the ID data signal 140 in the second I/O module 2-2. Eventually, "0x02" is output as the ID output signal 150 in the second I/O module 2-1. At this time, only the second I/O module 2-2 outputs a value to the module ID bus 400. The module ID input part 20 in the processing module 1 acquires a value of the module ID bus 400 from the module ID signal 40. In the same way, the processing module 1 recognizes that the I/O module having "0x02" as its ID is connected to the second I/O module 2-1. In the same way, the module select signal output part 10 causes the module select clock signal 30-ck to perform the toggle operation (to drive the signal line from the low level to the high level, or drive the signal line from the high level to the low level). As a result, it becomes possible for the module ID input part 20 to acquire IDs of the connected I/O modules one after another.

Finally, after the I/O module 2 that is the farthest from the processing module 1 has outputted an ID, an ID is not output to the module ID bus. The module ID input part 20 judges the state from the module ID bus 400, and finishes the inspection of the I/O module 2.

Third Embodiment

Figure 11:
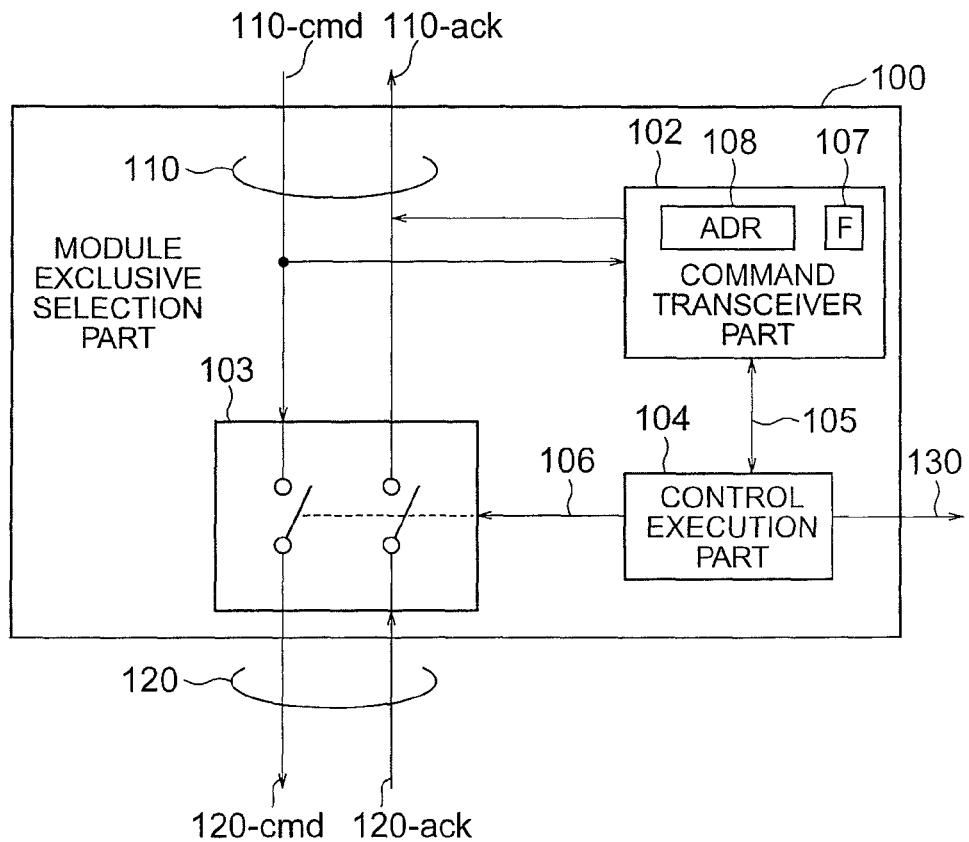
FIG. 11 is a detailed configuration diagram of a module exclusive selection part in a third embodiment of a computer system according to the present invention.

Another embodiment of the module exclusive selection part is shown in FIG. 11. A feature of the present embodiment is that the module exclusive selection part 100 communicates with the module select signal output part 10 and exercises module selection control. The module exclusive selection part 100 includes a command transceiver part 102, a module select signal switch part 103, and a control execution part 104. The command transceiver part 102 and the control execution part 104 are connected to each other by a request notice signal 105 for giving notice of a control request and a request completion. The control execution part 104 is connected to the module select signal switch part 103 by a switch control signal 106 for ordering the switch operation. The command transceiver part 102 receives control given by the module select signal output part 10, from a signal line 110-cmd. The signal line 110-cmd may be a single wire or may be composed of a plurality of wires. In the case of single wire, the module select signal output part 10 and the command transceiver part 102 communicate with each other by serial communication using level changes on the signal line. In the case of a plurality of wires, communication is conducted by using, for example, a command signal and a data signal each having a width of a plurality of bits. In addition, it is not necessary to prepare the signal line 110-cmd of the module select signal and a signal line 110-ack of a module select answer signal individually. For example, if a signal line is driven exclusively in time division, the same signal line can be shared.

Upon receiving a command from the signal line 110-cmd of the module select signal, the command transceiver part 102 interprets the received command and orders the control execution part 104 to exercise required processing. The command transceiver part 102 receives a result of the ordered processing from the control execution part 104, or conducts the processing itself and answers to the module select signal output part 10 by using the signal line 110-ack of the module select answer signal. The command transceiver part 102 is in a configuration noncompletion state as its initial state, and a configuration completion flag 107 is in a clear state. If predetermined processing is completed, the command transceiver part 102 receives a configuration completion command from the module select signal output part 10. Upon receiving the configuration completion command, the command transceiver part 102 sets the configuration completion flag 107 held therein and comes in a configuration completion state.

The control execution part 104 exercises open close control on the module select signal switch part 103 or exercises drive control on the module select activate signal 130. The control execution part 104 is ordered by the command transceiver part 102 to execute such processing.

Upon receiving a switch open close control order from the control execution part 104 via the switch control signal 106, the module select signal switch part 103 conducts connection or disconnection between the signal line 110 of the module select input signal and a signal line 120 of a module select output signal, i.e., exercises open close control on the switch. As the switch element, a semiconductor switch such as a MOS transfer gate, or a mechanical switch such as a relay can be mentioned. It is supposed that the switch state of the module select signal switch part 103 is the open (disconnection) state immediately after the power is turned on. In the foregoing description, upon receiving an order, the control execution part 104 exercises drive control of the module select activate signal 130. However, the command transceiver part 102 may directly drive a module select activate signal 130 or exercise switch open close control.

Figure 12:
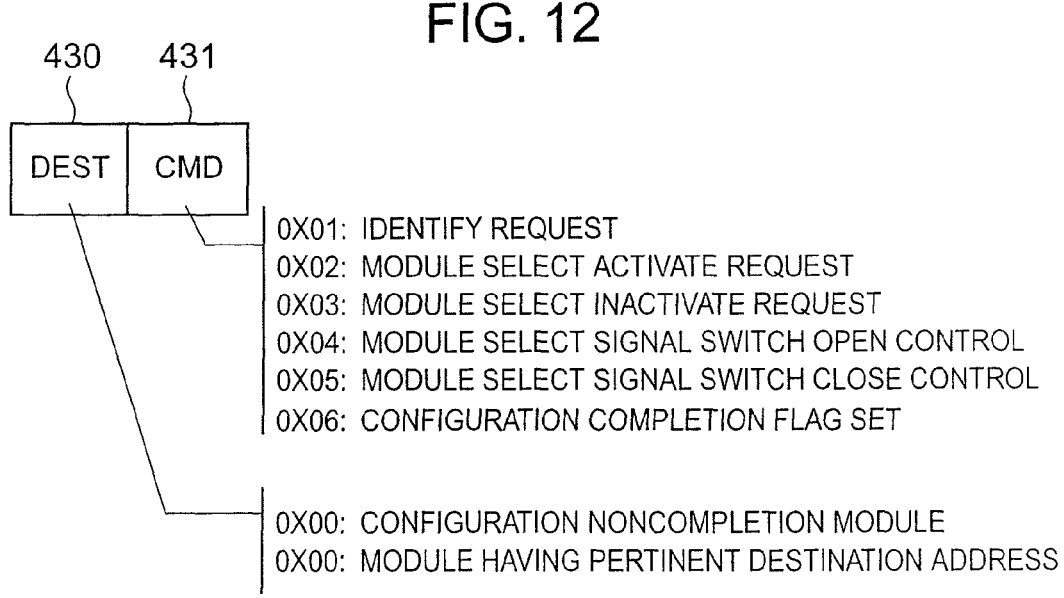
FIG. 12 is a configuration diagram of a command packet issued from a module select signal output part in a third embodiment.

A structure of a command packet issued from the module select signal output part 10 in the present embodiment is shown in FIG. 12. The command packet includes a destination address 430 and a command 431. FIG. 12 shows a list of commands. As the destination address 430, there are a special address for receiving an answer in the case where the command transceiver part 102 is in the configuration noncompletion state, and other addresses. In the case where the configuration completion flag 107 is in the clear state, the command transceiver part 102 is in the configuration noncompletion state, and answers to a special address (which is 0x00 in FIG. 12). The command transceiver part 102 has a unique address 108, which becomes unique among all command transceiver parts 102. By specifying a unique address as the destination address 430 of a command packet, it becomes possible to send the command 431 to an I/O module 2 having the specific unique address 108. As the command received by the command transceiver part 102, for example, there are an identify command for causing the unique address 108 of the command transceiver part 102 to be notified of, a command for controlling the module select activate signal 130, a command for controlling the module select signal switch part 103, and a command for setting the configuration completion flag 107.

In FIG. 12, a numerical value of 8 bits is shown as the destination address 430, but it is not restrictive. The command packet is not limited to the number of module select signal 30, but it is dealt with by serial communication using a single wire or multi-bit width communication using a plurality of wires.

Figure 13:
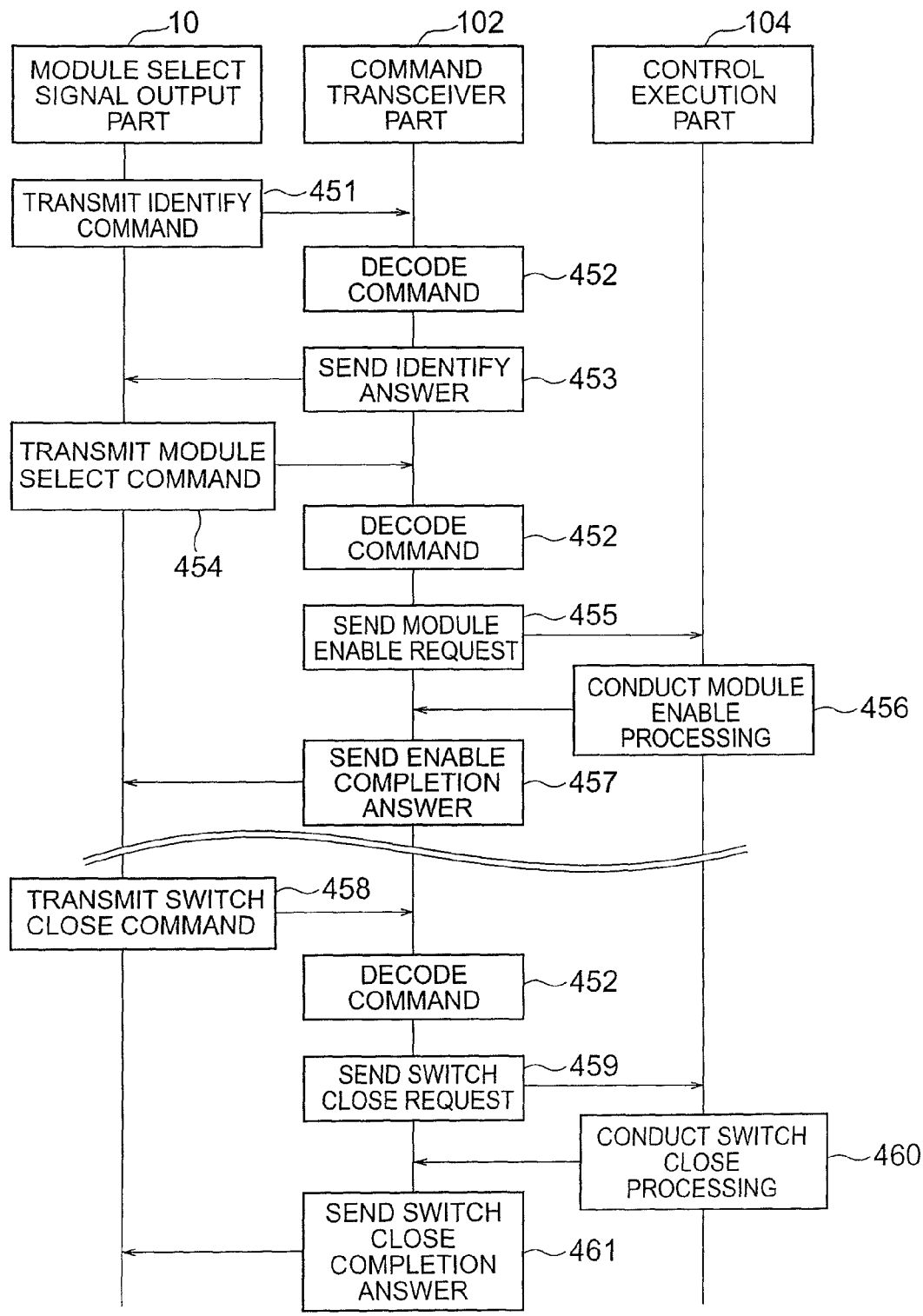
FIG. 13 is a flow chart showing a processing procedure in a third embodiment.

FIG. 13 shows a sequence diagram concerning the module select operation in the present embodiment. The present sequence diagram shows how components act on each other along the time series, and time elapses from the top of FIG. 13 toward the bottom. An algorithm for acquiring ID information of a plurality of connected I/O modules 2 will now be described with reference to FIG. 13. It is first supposed that all module select signal switch parts 103 are in the open (disconnection) state. Furthermore, the configuration completion flags 107 in all command transceiver parts 102 are in the clear state.

[Process 1]

The module select signal output part 10 transmits the identify command in order to discriminate a directly connected I/O module 2 (procedure 451). The identify command is represented as a command packet that has "0x00" as the destination address 430, i.e., that is directed to a module in the configuration noncompletion state, and that includes an identify request. At first, the module select signal switch 103 is in the open state. Consequently, the command packet arrives at only the I/O module 2-1 adjacent to the processing module 1. The command transceiver part 102 in the I/O module 2-1 decodes the received command (procedure 452). Upon receiving the identify command, the command transceiver part 102 answers the unique address that the command transceiver part 102 has (procedure 453). As a result, the module select signal output part 10 acquires the unique address 108 that the adjacent I/O module 2-1 has.

[Process 2]

Subsequently, the module select signal output part 10 transmits a module select command (procedure 454). The module select command is a command packet that has the unique address 108 acquired immediately before, as the destination address and that includes "0x02" indicating the module select activate request in the command 431. The command transceiver part 102 decodes the command (procedure 452). As a result, the command transceiver part 102 interprets that the command is a module select command for itself. The command transceiver part 102 sends a module select activate request to the control execution part 104 so as to assert the module select activate signal 130 (procedure 455). The control execution part 104 asserts the module select activate signal 130, and returns a result thereof to the command transceiver part 102 (procedure 456). Upon receiving the answer, the command transceiver part 102 sends an answer to the module select signal output part 10 to notify it that the processing has been finished (procedure 457).

[Process 3]

Thereafter, the module select signal output part 10 gives notice to the module ID input part 20, and the module ID input part 20 acquires ID information.

[Process 4]

The module select signal output part 10 transmits a command for canceling the module selection (the command 431 including a "module select cancel request"). Upon receiving the command, the command transceiver part 102 orders the control execution part 104 to negate the module select activate signal 130 in the same way as the process 2. The control execution part 104 negates the module select activate signal 130, and returns a result thereof to the command transceiver part 102. Upon receiving the answer, the command transceiver part 102 sends an answer to the module select signal output part 10 to notify it that the processing has been finished.

[Process 5]

The module select signal output part 10 transmits a configuration completion command (the command 431 including "configuration completion flag set"). The command transceiver part 102 sets the configuration completion flag 107 that it has to 1, and returns an answer to the module select signal output part 10.

[Process 6]

The module select signal output part 10 transmits a switch close command (the command 431 including "module select signal switch close control")(procedure 458). Upon decoding the command, the command transceiver part 102 orders the control execution part 104 to close the module select signal switch part 103 (procedure 459). The control execution part 104 returns an answer to the command transceiver part 102 to notify it that the module select signal switch part 103 has been closed (procedure 460). The module select signal output part 10 repeats the process 1 to the process 6 heretofore described, for all I/O modules 2. As a result of the process 1, an I/O module 2 having a command transceiver part 102 in which the configuration completion flag is not set to 1 reacts, and returns a unique address. And the module select signal output part 10 executes the process 2 to the process 6 one after another.

By repeating the processing heretofore described, an I/O module 2, in the order of increasing distance from the processing module 1, reports its own unique address and outputs ID information of the I/O module. Therefore, it becomes possible for the module ID input part 20 to acquire ID information in order. Finally, at a point in time at which the module ID input part 20 has acquired the ID information of all I/O modules 2, the present algorithm is finished. At this point in time, the module select signal output part 10 has completed in association of physical connection order of the I/O modules 2 with the unique addresses 108. In the same way, the module select signal output part 10 has completed in association of the connection order of the I/O modules 2 with the ID information as well.

Fourth Embodiment

Figure 14:
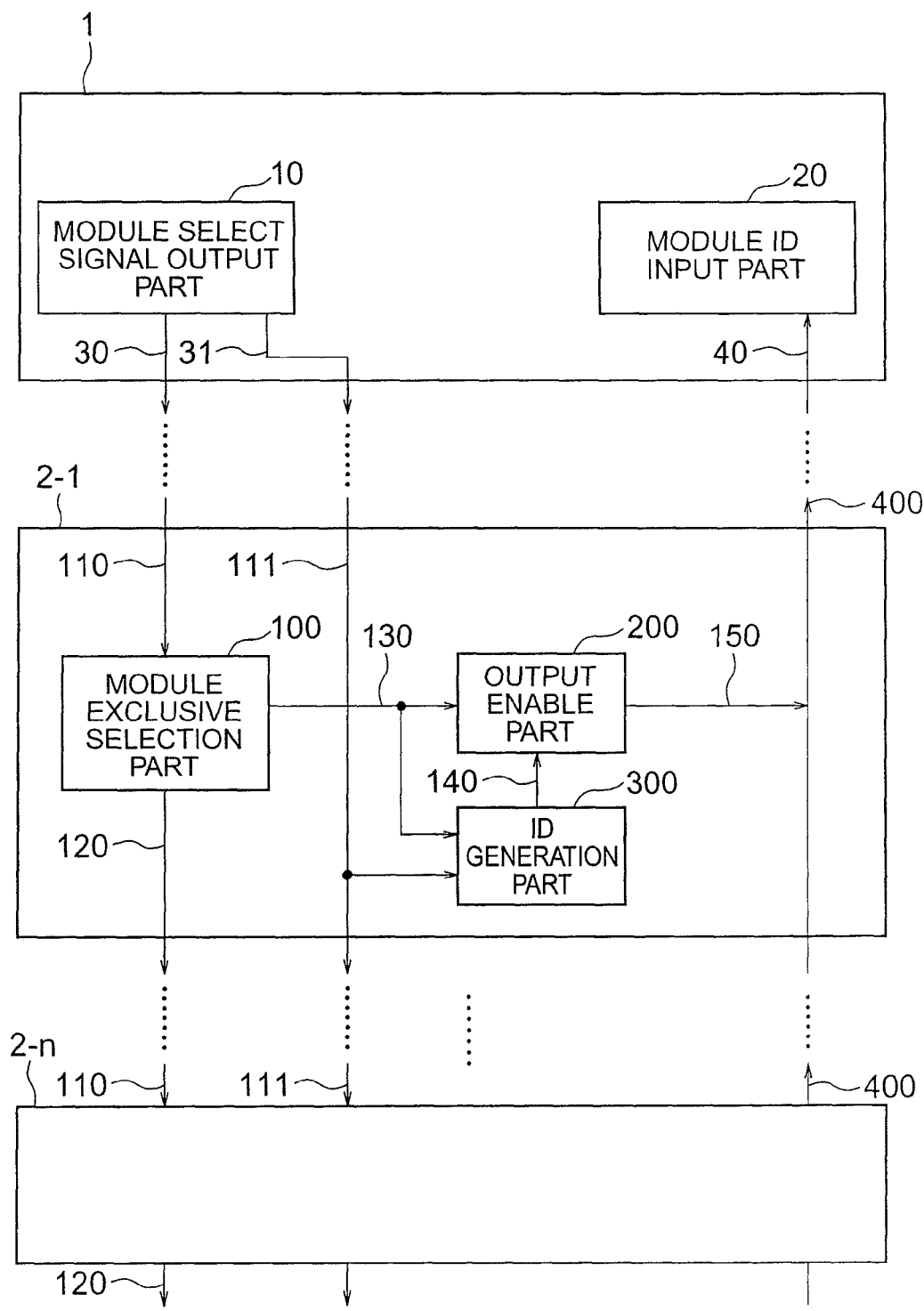
FIG. 14 is a general configuration diagram of a fourth embodiment of a computer system according to the present invention.

An embodiment of a computer system according to the present invention is shown in FIG. 14. The present embodiment has a feature in that the module select signal output part 10 outputs a module ID clock signal 31 and the ID generation part 300 receives a module ID clock input signal 111 and outputs an ID output signal 150.

First, the module select signal output part 10 causes the module select activate signal 130 to be asserted by using procedures similar to those in the embodiment described earlier. Thereafter, the module select signal output part 10 toggles the module ID clock signal 31. As a result, ID information is output to the ID output signal 150 in synchronism with the toggle of the module ID clock input signal 111. According to the present embodiment, it becomes possible for the module ID input part 20 to acquire ID information having a large number of bits from a small number of module ID buses 400 (for example, module ID bus 400) of a single wire.

Figure 15:
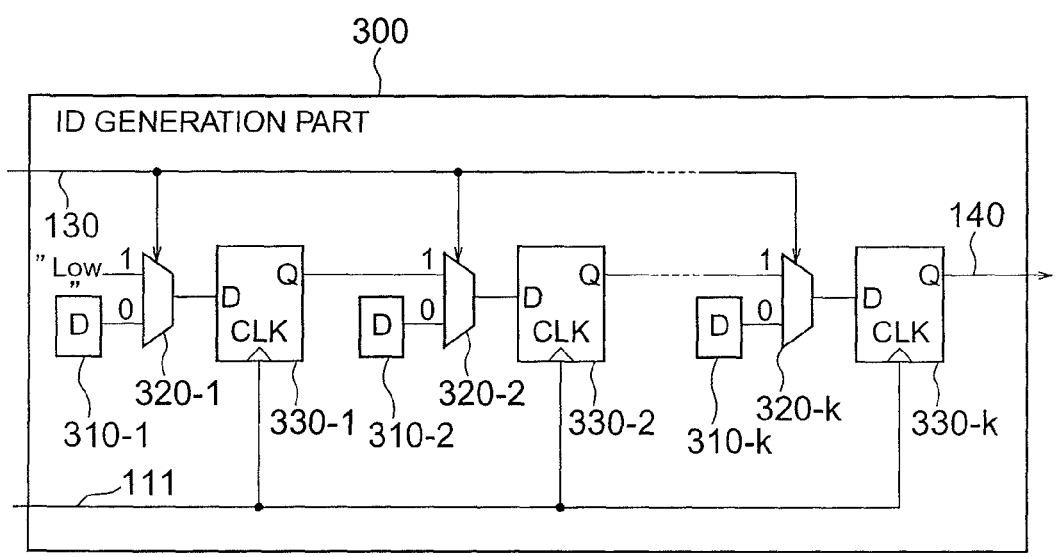
FIG. 15 is a detailed configuration diagram of an ID generation part in a fourth embodiment.

A configuration of the ID generation part 300 in the present embodiment is shown in FIG. 15. An ID generator 310, a selector 320 and a D flip-flop 330 form one unit. The ID generation part 300 is formed by coupling a plurality of (k in FIG. 15) units. ID generators 310-1 to k are similar to those shown in FIG. 4. Each of D flip-flops 330-1 to k is similar to that shown in FIG. 9. Each of the selectors 320-1 to k is an element for selecting and outputting an input signal denoted by "1" when the module select activate signal 130 is asserted and selecting and outputting an input signal denoted by "0" when the module select activate signal 130 is negated. By toggling the module ID clock input signal 111 when the module select activate signal 130 is asserted, values in the ID generators 310-1 to k are output to the ID data signal 140 in order.

Figure 16:
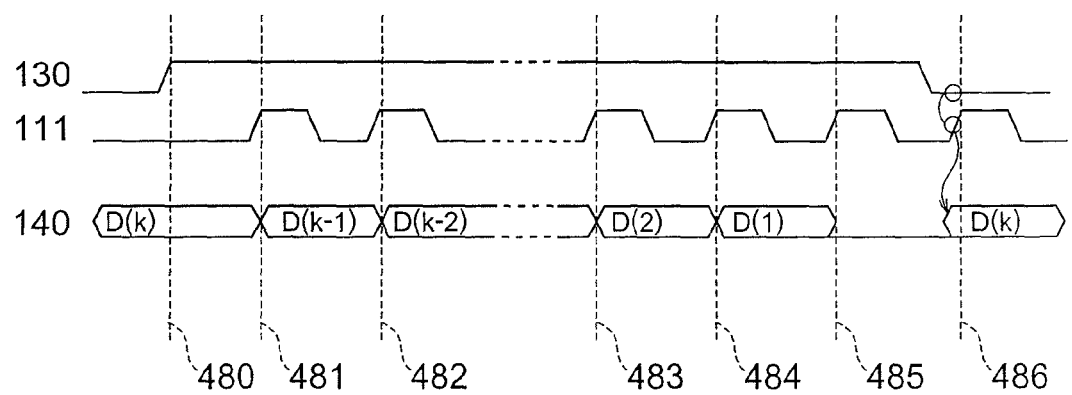
FIG. 16 is a timing chart showing operation of a fourth embodiment.

A timing chart representing the operation of the ID generation part 300 in the present embodiment is shown in FIG. 16. As first, the ID data signal 140 outputs the value of the kth ID generator 310-k. It is supposed that the D flip-flops 330-1 to k in the ID generation part 300 output values in the ID generators 310-1 to k, respectively. When the module select activate signal 130 is asserted, the value of the ID data signal 140 is output to the module ID bus 400 via the output enable part 200 (point in time 480). Subsequently, when the module select signal output part 10 drives the module ID clock signal 31 from the low level to the high level, the D flip-flops 330-1 to k hold outputs of the selectors 320-1 to k and output them to Q terminals, respectively (point in time 481). At this point in time, all of the selectors 320-1 to k select input signals denoted by "1." Eventually in the ID generation part 300, shift operation of taking a value stored in each D flip-flop into its subsequent D flip-flop is conducted. Thereafter, when the module ID clock signal 31 is toggled by the module select signal output part 10, values in the ID generators 310 are output to the ID data signal 140 one after another in synchronism with the toggling (points in time 482 to 485). The value output to the ID data signal 140 is output to the module ID bus 400 via the output enable part 200. After values in all ID generators 310 have been output, the module select activate signal 130 is negated. Thereafter, the module select signal output part 10 drives the module ID clock signal 31 from the low level to the high level (point in time 486). By this operation, all D flip-flops 330-1 to k are initialized with the values in the ID generators 310-1 to k, respectively. In this way, the ID generation part 300 outputs the ID information to the ID data signal 140.

In order to initialize the values in the D flip-flops 330-1 to k, the module select signal output part 10 needs to drive the module ID clock from the low level to the high level at least once before conducting module selection.

Fifth Embodiment

Figure 17:
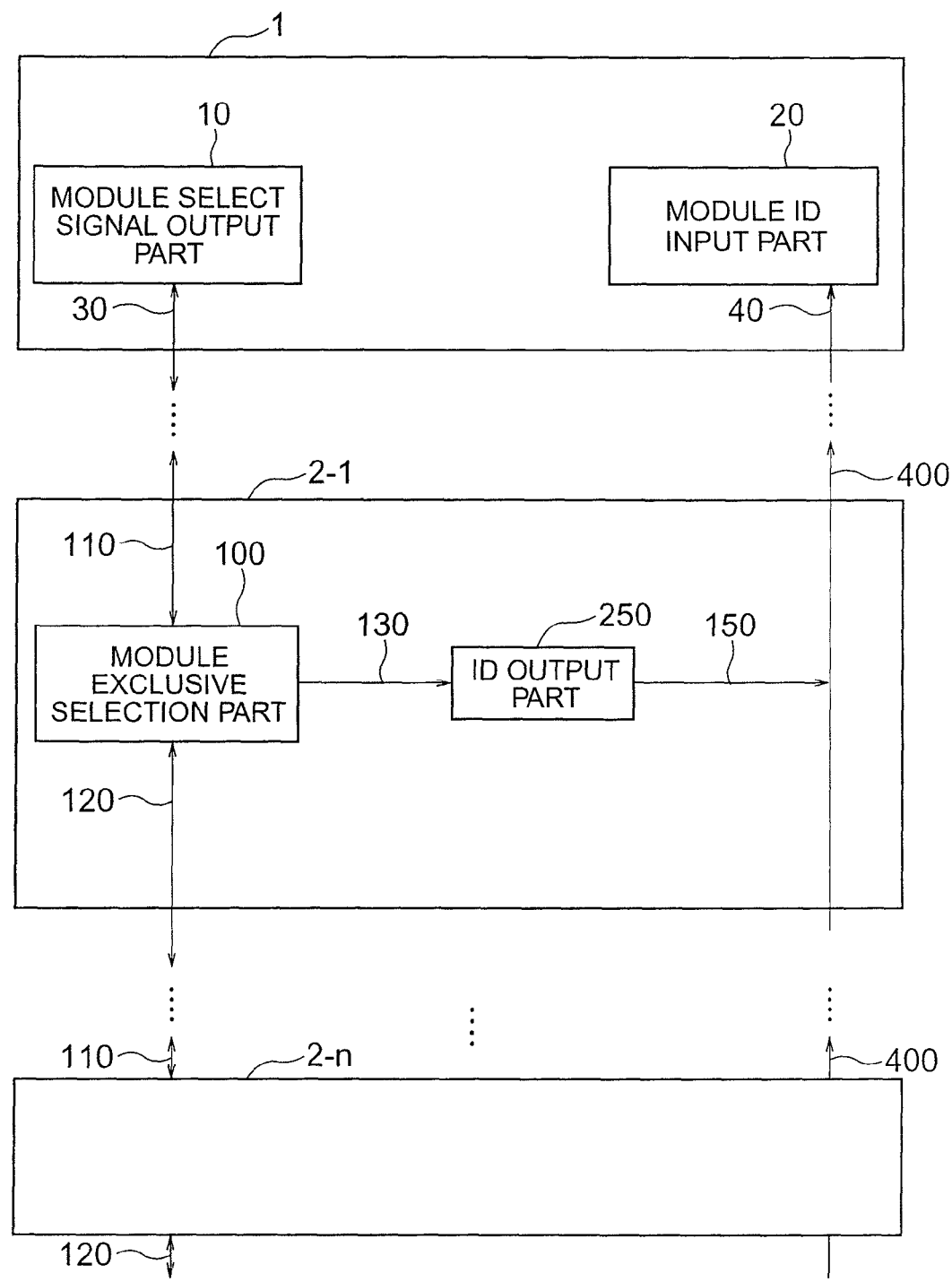
FIG. 17 is a general configuration diagram of a fifth embodiment of a computer system according to the present invention.

A configuration of another embodiment of a computer system according to the present invention is shown in FIG. 17. The present embodiment has a feature that an ID output part including both the ID generation part 300 and the output enable part 200 is provided. When the module select activate signal 130 is input to the ID output part 250, ID information defined in the ID output part 250 is output to the module ID bus 400 via the ID output signal 150. The ID output part 250 drives only a signal line that needs to be driven, to the low or high level. In the case of an ID output part 250 that drives a plurality of signal lines in the module ID bus to the low level when the module select activate signal 130 is asserted, it is necessary to hold the level on the module ID bus 400 by using pull-up resistors. In the case of an ID output part 250 that drives a plurality of signal lines in the module ID bus to the high level when the module select activate signal 130 is asserted, it is necessary to hold the level on the module ID bus 400 by using pull-down resistors.

Figure 18:
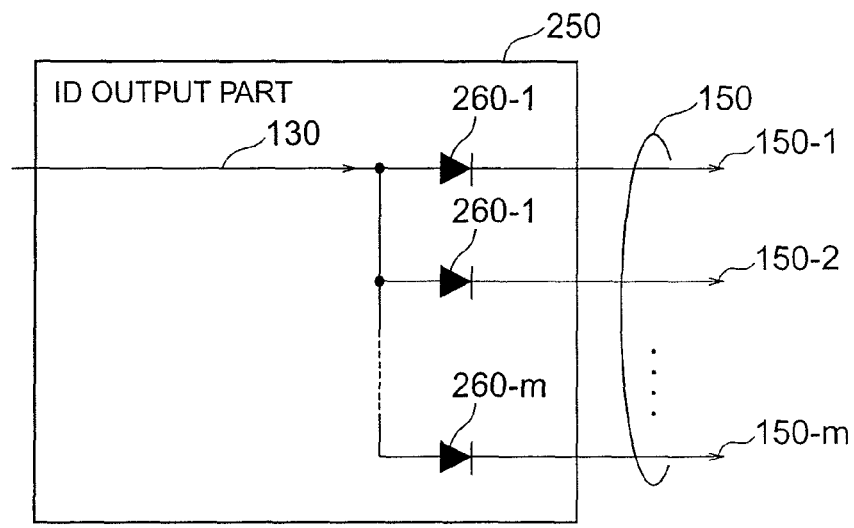
FIG. 18 is a detailed configuration diagram of an ID output part in a fifth embodiment.

A concrete configuration of the ID output part 250 in the present embodiment is shown in FIG. 18. With reference to FIG. 18, the ID output part 250 includes diodes 260. The diodes 260 are connected between the signal line of the module select activate signal 130 and signal lines of ID output signals 150, respectively. In FIG. 18, the diodes 260 are connected to all ID output signal lines 150. As a matter of fact, however, the diode 260 is inserted or removed according to the ID information to be output. In the case where a diode 260 is removed, the signal line becomes open. As a result, the pertinent ID output signal 150 becomes high impedance state irrespective of the module select activate signal 130.

It is now supposed that the module ID bus 400 is held at the low level by pull-down resistors. When the module select activate signal 130 is asserted, the output from the diode 260 becomes the high level. Therefore, ID output signals 150 having the diodes 260 connected in series output high levels, whereas open ID output signals 150 having no diodes 260 connected in series remain at the low level. When the module select activate signal 130 is asserted, therefore, associated ID information is output to the module ID bus 400.

In FIG. 18, a transistor having an open collector output (or a buffer corresponding thereto) may also be used instead of the diode 260. In that case, when the module select activate signal 130 is asserted, an ID output signal 150 having an inserted transistor outputs the low level. If at this time the module ID bus 400 is held at the high level by pull-up resistors, it is possible to output ID information to the module ID bus 400 in the same way.

Sixth Embodiment

Figure 19:
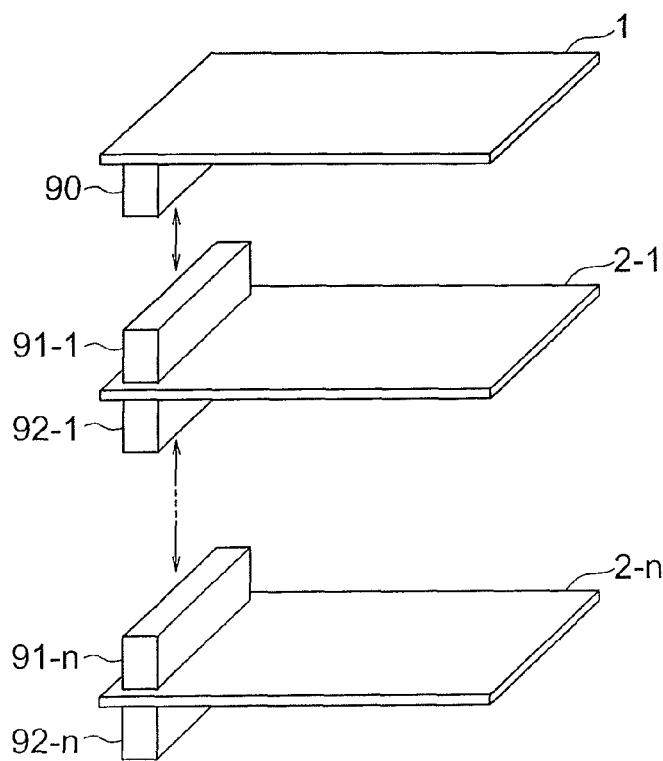
FIG. 19 is a diagram showing an embodiment of a module mounting method of a computer system according to the present invention.

An embodiment of a module mounting method in a computer system according to the present invention is shown in FIG. 19. In the present embodiment, a stacked structure of one processing module 1 and a plurality of I/O modules 2 is shown. As for the processing module 1, its circuit is formed on first and second sides of a print circuit board, and a connector 90 is mounted on the second side of the print circuit board. The connector 90 is disposed so as to be coupled to a connector 91 mounted on a first side of the I/O module 2. In the same way, the circuit of the I/O module 2 is formed on a print circuit board. The connector 91 is mounted on the first side of the print circuit board, and a connector 92 is mounted on a second side of the print circuit board. The connector 90 is a component for connecting the input and output signals of the processing module 1 to the I/O module 2. The input and output signals include the module select signal 30, the module ID signal 40 and the system bus signal 80. The connector 91 is a component for connecting the input and output signals from the processing module 1 or another I/O module to a circuit within the I/O module 2. The connector 91 includes the signal line 110 of the module select input signal, the module ID bus 400 and the system bus 500. The connector 92 is a component for connecting the input and output signals from the I/O module 2 to another I/O module. The connector 92 includes the signal line 120 of the module select output signal, the module ID bus 400 and the system bus 500. The connector 92 and the connector 91 are formed so as to fit with each other. In the same way, the connector 90 and the connector 91 fit with each other.

Owing to such a structure, it becomes possible to connect the I/O module 2 to both the processing module 1 and another I/O module 2. Therefore, as many I/O modules 2 as needed can be stacked and connected to the processing module 1, and a computer system can be formed flexibly.

Seventh Embodiment

Figure 20:
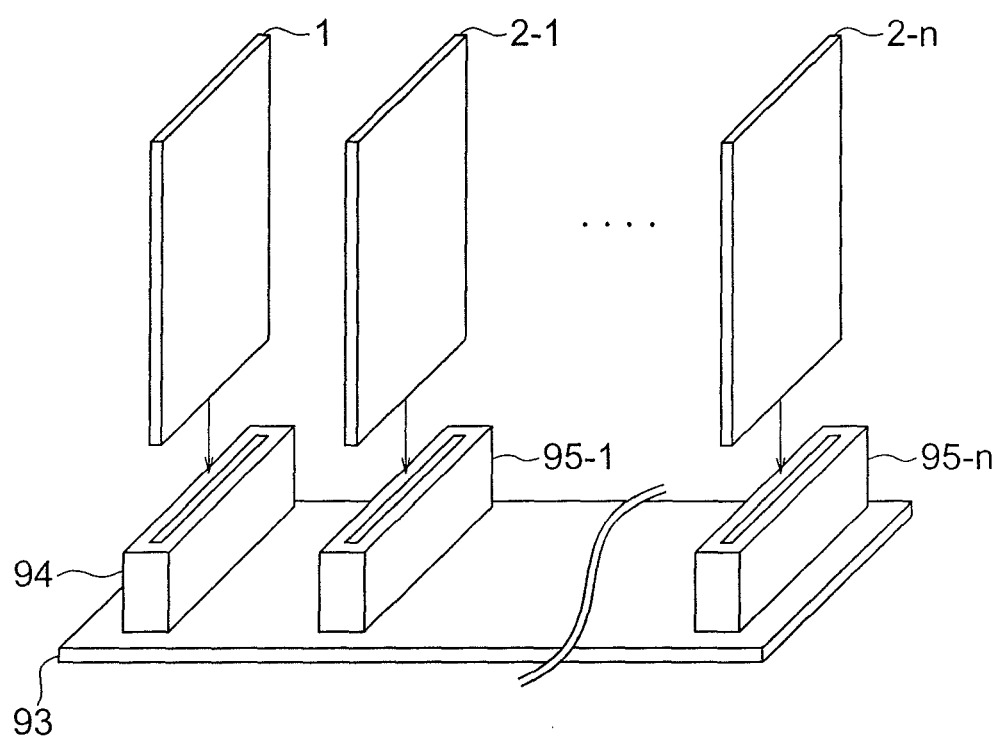
FIG. 20 is a diagram showing another embodiment of a module mounting method of a computer system according to the present invention.

Another embodiment of a module mounting method of a computer system according to the present invention is shown in FIG. 20. The present embodiment represents a structure in which one processing module 1 and a plurality of I/O modules 2 are connected on a back board 93.

The back board 93 includes a connector 94 and connectors 95-1 to 95-$n$. Each of those connectors has a slit for inserting and holding a print circuit board therein, and has electrodes for electrically connecting to contacts on the print circuit board of the processing module 1 or contacts on the print circuit board of an I/O module 2. Each of the connectors 94 and 95-1 to 95-$n$ connects contacts of a print circuit board inserted into a slit to wiring on the back board. Wiring between the connector 94 and the connector 95-1 is effected on the back board 93 so as to connect the module select signal 30 to the signal line 110 of the module select input signal, connect the module ID signal 40 to the module ID bus 400, and connect the system bus signal 80 to the system bus 500. Wiring between the connector 95-$j$ and the connector 95-$\{j+1\}$ (where j=1 to n-1) is effected on the back board 93 so as to connect the signal line 120 of the module select output signal on the connector 95-$j$ to the signal line 110 of the module select input signal on the connector 95-$\{j+1\}$, connect the module ID bus 400 on the connector 95-$j$ to the module ID bus 400 on the connector 95-$\{j+1\}$, and connect the system bus 500 on the connector 95-$j$ to the system bus 500 on the connector 95-$\{j+1\}$. By inserting the processing module 1 into the connector 94 and inserting the I/O modules 2 into the connectors 95-1 to 95-$n$ so as to couple wiring from the processing module 1 to the connectors 95-1 to 95-$n$.

Although the structure in which a print circuit board is inserted directly into a slit of a connector is shown in FIG. 20, connectors may be mounted on both the print circuit board and the back board 93. In that case, the connectors are formed so as to fit with each other. By coupling connectors on print circuit boards to connectors on the back board, a computer is formed.

The back board 93 and the processing module 1 may be formed on the same board. In that case, connectors 95 are mounted on the processing module 1, and the I/O modules 2 are connected to the connectors 95, respectively. Owing to such a structure, expansibility can be secured without preparing a back board separately.

According to the embodiments of the present invention, the processor can recognize a plurality of devices connected to the bus irrespective of the bus scheme and can access devices having an arbitrary bus scheme, as heretofore described. Furthermore, setting for each module relying upon manual work is made unnecessary. Even in the case where modules having the same circuit are combined, it becomes possible for the processor to recognize a device.

According to the present invention, it becomes possible to discriminate kinds or the like of the I/O modules connected to the processing module and access devices in the I/O modules without being restrained to a specific bus scheme, as heretofore described.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A modular computer system formed by connecting a processing module having a processor mounted thereon and a plurality of I/O modules in a stacked form via connectors, where differing ones of the plurality of I/O modules being differing types of I/O modules from one another, which operate with mutually differing types of bus-layout configurations, and where at least a portion of said connectors representing a reconfigurable generic bus, wherein
each I/O module comprises:
an I/O module connector representing one of the connectors;
a module exclusive selection part for activating the module responsive to a module select signal input from a terminal in a predetermined position on a processing module side connector, the predetermined position being the same for said I/O modules; and
an ID output part for outputting identification information of its own I/O module to at least one predetermined terminal on the I/O module connector on the basis of the module select signal output from said module exclusive selection part;
wherein said processing module comprises:
a module select signal output part for outputting the module select signal to a connector terminal to which the I/O module is connected; and
an ID input part for taking in the identification information output to the at least one predetermined terminal on the I/O module connector,
where said module select signal output part outputs the module select signal successively to the I/O modules connected to the processing module, and
said ID input part recognizes the I/O modules and the identification information in association with an output order of the module select signal; and
wherein in accordance with the association of the I/O modules with the identification information, for each differing type of I/O module stacked via the connectors, said processing modules reads out bus protocol, set up/hold duration timing of address-data-control signal, bus control parameter of bus width and device driver of the I/O module out of memory set in the predetermined position on a processing module side connector for accessing the differing type of I/O module.

2. The modular computer system according to claim 1, wherein
said module exclusive selection part has a plurality of wires connected to a plurality of connector terminals of the input connector on the processing module side,
one of the wires is connected to said ID output part, and
one of other wires is connected to a terminal that is included in a plurality of connector terminals on the output connector, and that is in the same position as that of the connector terminal supplied with a module select signal that selects its own module.

3. The modular computer system according to claim 1, wherein said module exclusive selection part is formed by connecting a D terminal of a D type flip-flop to one of connector terminals on the input connector, connecting a Q output terminal of said D type flip-flop to said ID output part and to a terminal that is included in the output connector and that is in the same position as that of the connector terminal to which the D terminal is connected, and connecting a clock terminal of said D type flip-flop to a terminal to which connector terminals on the input connector and output connector are connected in common.

4. The modular computer system according to claim 3, wherein said processing module drives the connector terminal to which the clock terminal is connected, with a clock signal, and drives the connector terminal to which the D terminal is connected, with an enable signal.

5. The modular computer system according to claim 1, wherein said ID output part comprises:
an ID generation part for generating identification information of its own module; and
an output enable part for outputting the identification information generated by said ID generation part to a predetermined terminal on the input connector.

6. The modular computer system according to claim 5, wherein said ID generation part generates the identification information as a serial signal on the basis of the activate signal and a clock signal.

7. The modular computer system according to claim 1, wherein said ID output part is formed by connecting wires driven by the activate signal to a plurality of predetermined terminals on the input connector via PN-junction elements according to the identification information.

8. The modular computer system according to claim 1, wherein said processing module selects from differing preset bus timing sequences from the memory, to dynamically reconfigure a timing sequence operational on the reconfigurable generic bus.

* * * * *